United States Patent [19]

Eberhardt

[11] Patent Number: 5,072,379
[45] Date of Patent: Dec. 10, 1991

[54] NETWORK OF DEDICATED PROCESSORS FOR FINDING LOWEST-COST MAP PATH

[75] Inventor: Silvio P. Eberhardt, Pasadena, Calif.

[73] Assignee: The United States of America as represented by the Adminstrator of the National Aeronautics and Space Administration, Washington, D.C.

[21] Appl. No.: 357,759

[22] Filed: May 26, 1989

[51] Int. Cl.⁵ .................. G06F 15/20; G06G 7/48
[52] U.S. Cl. ................................. 364/402
[58] Field of Search ........................ 364/402

[56] References Cited

U.S. PATENT DOCUMENTS

| | | |
|---|---|---|
| 2,109,962 | 7/1980 | Marsh et al. ............... 364/402 |
| 3,411,140 | 11/1968 | Halina et al. ............. 340/172.5 |
| 3,462,743 | 8/1969 | Milewski .................. 340/172.5 |
| 3,474,240 | 10/1969 | Marquis et al. ............. 235/165 |
| 3,511,937 | 3/1970 | Bastian et al. ............... 179/18 |
| 3,525,814 | 8/1970 | Cox .......................... 179/18 |
| 3,974,481 | 8/1976 | Ledieu et al. ............. 340/172.5 |
| 4,193,115 | 3/1980 | Albus ....................... 364/600 |
| 4,210,962 | 7/1980 | Marsh et al. ............... 364/402 |
| 4,615,011 | 9/1986 | Linsker .................... 364/491 |
| 4,744,026 | 3/1988 | Vanderbei .................. 364/402 |
| 4,744,027 | 3/1988 | Bayer et al. ............... 364/402 |
| 4,744,028 | 5/1988 | Karmarkar .................. 364/402 |
| 5,001,631 | 3/1991 | Castelaz ................... 364/402 |

OTHER PUBLICATIONS

"Mathematical Programming and Electrical Networks" by Jack B. Dennis, The Technology Press of the Massachusetts Inst. of Technology, 1959.

Primary Examiner—Dale M. Shaw
Assistant Examiner—Laura Brutman
Attorney, Agent, or Firm—Thomas H. Jones; Harold R. Adams; John R. Manning

[57] ABSTRACT

A method and associated apparatus for finding the lowest cost path of several variable paths comprising a plurality of linked cost-incurring areas existing between an origin point and a destination point. The method comprises the steps of, connecting a plurality of nodes together in the manner of the cost-incurring areas; programming each node to have a cost associated therewith corresponding to one of the cost-incurring areas; injecting a signal into one of the nodes representing the origin point; propagating the signal through the plurality of nodes from inputs to outputs thereof; reducing the signal in magnitude at each node as a function of the respective cost of the node; and, starting at one of the nodes representing the destination point and following a path having the least reduction in magnitude of the signal from node to node back to the one of the nodes representing the origin point whereby the lowest cost path from the origin point to the destination point is found.

21 Claims, 2 Drawing Sheets

NETWORK OF DEDICATED PROCESSORS FOR FINDING LOWEST-COST MAP PATH

ORIGIN ON THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to computing networks and, more particularly to a network comprised of VLSI circuit designed processing nodes configured in a network to find the lowest-cost map path in a particular instance by associating a traversing cost at each node and calculating at each node the total cost of a path from a particular originator node to the destination node.

Specifically, the invention relates to a system for finding the lowest cost path of several variable paths comprising a plurality of linked cost-incurring areas existing between an origin point and a destination point comprising, a plurality of nodes connected together in the manner of the cost-incurring areas, each node being programmable to have a cost associated therewith corresponding to one of the cost-incurring areas, each node having a plurality of inputs for receiving a first signal from ones of the nodes connected thereto and a plurality of outputs for outputting a second signal comprising a first signal as received at the input reduced in magnitude as a function of the respective cost associated with the node to others of the nodes connected thereto; signal providing means for injecting a signal into one of the nodes representing the origin point whereby the signal propagates through the plurality of nodes from the inputs to the outputs thereof being reduced in magnitude by each node as a function of the respective cost of the node; and, path tracing means for starting at another of the nodes representing the destination point and for following a path having the least reduction in magnitude of the signal from node to node back to the one of the nodes representing the origin point whereby the lowest cost path from the origin point to the destination point is found.

The preferred embodiment also includes means for calculating the cost associated with the lowest cost path as a function of the total reduction in magnitude of the signal between its injection at the node representing the origin point and its arrival at the node representing the destination point. Also in the preferred embodiment there are direction finding means connected to the inputs of each node for receiving the second signal from ones of the nodes connected thereto and for providing an output indicating which of the ones of the nodes connected thereto is providing the second signal the least reduced in magnitude, and wherein the path tracing means includes means for using the output of the direction finding means to trace the lowest cost path from node to node.

BACKGROUND ART

In the field of what could be broadly referred to as map or path processing, the least-cost path problem is important in a variety of military, space, and research applications. In this regard, the term "cost" can refer to a variety of things from actual dollars and cents to the loss of human life. The problem can be characterized as follows—given a map of some "space" where the space comprises a plurality of nodes interconnected by paths which can be selectively taken and wherein each of the nodes (i.e. points or areas) has associated therewith a cost of traversing that node; find the least cost path of traveling from one particular originating node to another node and find the cost of that traversing. For example, on a battlefield it is desired that tanks be driven from one position to another. From surveillance and satellite information, the difficulty of driving a tank across each ten foot square quadrant (i.e. node) is know (taking into account the slope of the land, vegetation, lakes, etc.). From this information, as well as knowledge of enemy positions and weapons capability, a cost function can be calculated and assigned to each quadrant. The problem is to find the best route for the tank movement—in the shortest possible time.

Solving such problems according to prior art computing techniques becomes very time intensive on serial computer as the number of nodes (or quadrants in the above-described example) increases. Heuristic means are usually employed to find a solution, with the consequent loss of guarantee that the best path will be found. Furthermore, a significant advantage in tactical problems (such as the tank problem), and the like, if the solution can be found in real time. To illustrate this point, suppose the tanks as postulated above have succeeded in reaching the half-way point of their journey when new information becomes available (such as the discovery of an uncharted bog in their path or a sudden and unexpected shift in enemy firepower). If the new information could be promptly incorporated into the path-finding system, a new "best path" could be determined thus possibly saving the tanks from enemy annihilation. Certainly the tank commanders will not wish to wait while some behind the lines mainframe computer grinds away on the problem. They need answers and they need them fast.

In the prior art, this type of problem is usually formulated in a different way for computing purposes; that is, the nodes are commonly considered to be cost-free and costs are incurred at the edges, i.e. in the paths between nodes. Such an arrangement is shown in simplified form in FIG. 1. The nodes 10 (labelled A-G for convenience) are, in fact, switching points while the connecting paths 12 are given a weighted value corresponding to the cost of traversing. In a digital computer implementation, this is typically accomplished with software while in an analog computational system the paths 12 would be assigned some sort of measurable electrical characteristic and the nodes 10 would actually accomplish switching functions as the various paths were tried and measured. Thus, in either approach, to find the costs of the various ways of getting from node "A" to node "G", one would (either electrically or through software depending on the implementation) use some sort of path analysis capability 14 to try the various paths by trial and error to determine the cost of each and thereby the lowest-cost path by comparison. Obviously, such a serial approach is far from "real-time" and is not prone to instant reconfiguration in the event of updates to information. Such an approach is described in greater detail in "Mathematical Programming and Electrical Networks" by J. B. Dennis, MIT Press 1959, a copy of which is filed herewith.

STATEMENT OF THE INVENTION

Accordingly, it is an object of this invention to provide a practical solution to the lowest-cost path problem which can provide answers on a real-time basis.

It is another object of this invention to provide answers to the lowest-cost path problem on an instantly updateable basis in response to changing conditions affecting the answer to the problem in each instance.

Other objects and benefits of this invention will become apparent from the detailed description which follows hereinafter when taken in conjunction with the drawing figures which accompany it.

DETAILED DESCRIPTION OF THE INVENTION

Figures 1, 2:
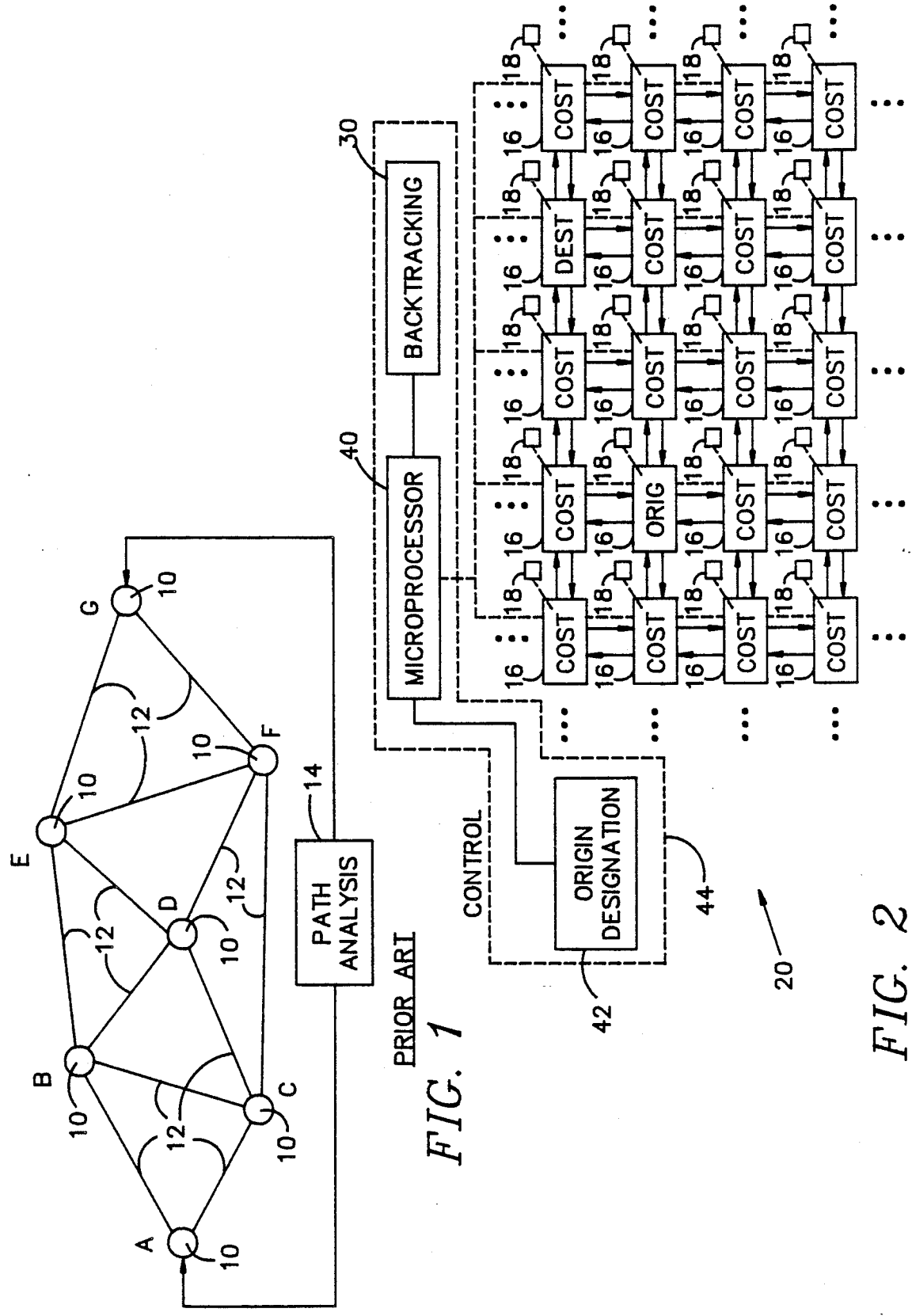
FIG. 1 is a simplified drawing showing a prior art approach to solving a path cost problem.
FIG. 2 is a simplified drawing of a system according to the present invention.

The objects of the invention have been achieved by incurring the "costs" in each instance on the node or pixel level (interconnecting paths being, by definition, infinitely short and thereby incurring no cost in the problem solution); and, implementing the nodes as a matrix of pixel-processors 16 operating in parallel and fully asynchronously as depicted in FIG. 2. This architecture has the capability of, for example, being implemented in VLSI circuity for low cost and small size—which is particularly useful in battlefield and space applications. Each pixel-processor 16 is connected only to its four nearest neighbors (note that, for example, six- or eight-neighbor circuits may also be designed and implemented with the four-neighbor circuit being employed for simplicity and convenience herein only). One pixel-processor 16 is designated by origin designation circuit 42 through an associated switch 48 as the originator node (ORIG) and is caused to send out a constant maximum signal level to its four neighbors (designated hereinafter and in the drawings for convenience as north (N), south (S), east (E), and west (W), respectively. All other nodes take the maximum of the signal level of their four neighbors and scale that signal down according to the cost of traversing that node (i.e. pixel-processor 16) as programmed into the pixel-processor 16 by means of an individual associated cost input as indicated by the box 18. The resulting value at each neighbor pixel-processor 16 corresponding to the cost of the path from the originator pixel-processor 16 to and through that neighbor pixel-processor 16 is, in turn, passed on to all four neighbor pixel-processors 16 of each pixel-processor 16. To operate the system 20 of FIG. 2, the costs are programmed into the matrix using the cost inputs 18 and the originator pixel-processor 16 is activated. From the originator node pixel-processor 16 outwards, a wavefront of processing occurs as the signal emanating from the originator node pixel-processor 16 is picked up, modified, and transmitted from pixel-processor 16 to pixel-processor 16. After the system settles (in only a few moments), the signal level at each node corresponds to the total cost of the best path to that node from the originator. Note that the system will remain stable as long as no pixel-processor 16 has gain (i.e. sends out a signal larger than the maximum received input).

To find the actual best path, some means is required for backtracking through the intermediate node pixel-processors 16 in the lowest cost path from the destination node pixel-processor 16 (DEST), whose operation is not unique, back to the originator pixel-processor 16. This can be achieved by polling the destination node pixel-processor 16 to determine from which of its four neighboring node pixel-processor 16 it is receiving the maximum (i.e. best path) input. The process is then repeated at that neighboring node pixel-processor 16 and repeated recursively until the best path is traced back to the originator node pixel-processor 16. In the preferred embodiment, this is achieved by a digital processor 40 incorporated into control circuit 44, also containing backtracking circuit 30.

Because of the localized connectivity of this approach, it is eminently suitable for VLSI implementation; however, while a standard VLSI chip can implement thousands of such pixel-processors 16, it is expected that a useful test path processor according to the present invention may require up to a million pixel-processors 16. Consequently, it may be necessary to implement a wafer-level best-path processor. This is quite feasible, of course, since the system 20 is basically fault-tolerant in that a few defective pixel-processors 16 will not render results invalid. The best path determination operates essentially in real time, although the digitally operated backtracking procedure is linearly time dependent upon best path lengths. As can be appreciated, however, its operation, being linear instead of iterative and comparative as in the prior art approaches, should approach real time, at least by comparison to the prior art alternatives. In the worst case, by employing a system 20 according to the present invention, the tank commanders in the above-mentioned example should be able to receive updated best path information after no more than a few moments of computational backtracking.

Figure 3:
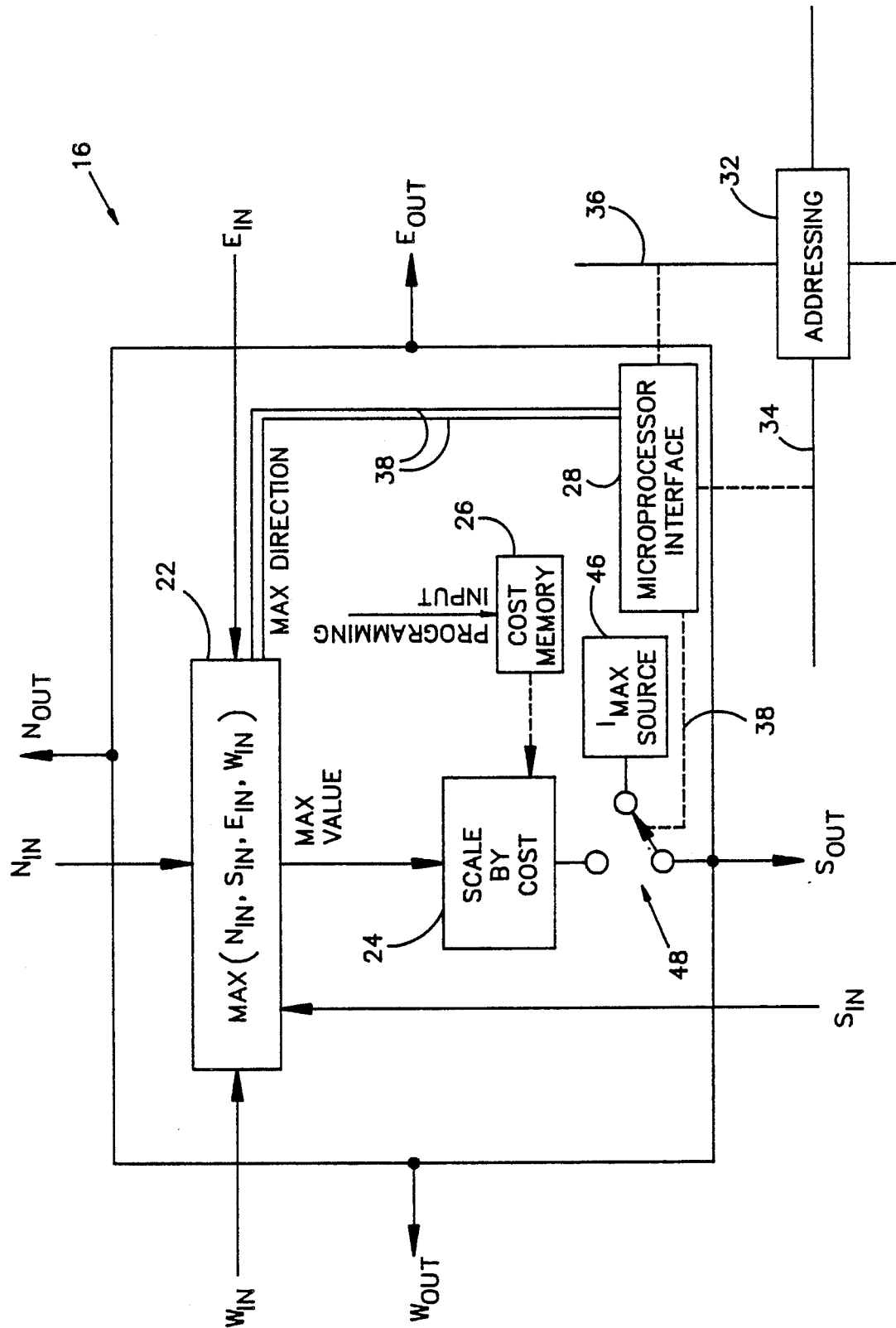
FIG. 3 is a functional block diagram of one of the novel pixel-processors employed in the system of the present invention.

In the preferred embodiment, each pixel-processor 16 has the form shown in FIG. 3. Each pixel-processor 16 consists of a maximum circuit 22, a scaling circuit 24, a cost memory 26, a digital microprocessor interface circuit 28, a maximum signal source 46, and the switch 48. The maximum circuit 22 takes the signals from the a pixel-processor's four neighbors (i.e. N,E,S, and W) and determines the maximum of the four signal levels. The maximum circuit 22 also determines the direction that this maximum signal comes from and provides it to the backtracking circuitry 30 in a manner which will be understood shortly.

The scaling circuit 24 reduces the signal level by some function of the cost programmed into that pixel-processor's cost memory 26. Scaling is performed such that a circuit with low traversing cost does not significantly attenuate the through-propagated path-cost signal. Scaling can be multiplicative or additive, depending on the desired cost function. Typically, the cost memory 26 will be some sort of analog device. The cost value may be programmed in several techniques well known in the art and applied to neural computing networks, which techniques form no part of the present invention per se. For example, it may be desirable to optically project the map onto the VLSI chip such that cost is encoded as light intensity and is detected by way of a photosensor circuit. Conversely, costs may be programmed pixel-processor by pixel-processor using, for example, capacitors to store voltages corresponding to the cost. These voltages may be periodically refreshed using external RAM memory and a digital-to-analog converter.

The digital microprocessor interface circuit 28 is used by the microprocessor 40 connected thereto to program one pixel-processor 16 (through its switch 48) to be the originator and to back propagate through the lowest cost path by polling individual node pixel-processors 16 to determine the direction of maximum signal input. Each digital microprocessor interface circuit 28 is individually addressably connected to the microprocessor 40 contained within the control circuit 44. Also shown in FIG. 3, where it is designated as 32, is an addressing circuit by means of which each pixel-processor 16 may be individually accessed by the microprocessor 40 using row and column select lines 34 and 36, respectively. At least three bit lines 38 common to all pixel-processors 16 and individually addressable by the microprocessor 40 are also included, one to allow the microprocessor 40 to switch (i.e. program) the originator select switch 48, and two to indicate back to the microprocessor 40 the direction of the maximum signal during backtracking. As those skilled in the art will readily appreciate, additional bit lines 38 will be required in the event that six or eight neighbor pixel-processors 16 are connected to each node pixel-processor 16.

While the foregoing description and the claims that follow are directed to injecting a maximum signal at the origin node and having each intermediate node reduce the signal on the basis of the "cost" associated therewith, as those skilled in the art will readily recognize and appreciate, a minimum signal could be injected to be increased by the cost factor. Also, the signal could be modified in other ways to reflect the cost of passing through each node. These various alternatives are to be considered within the scope and spirit of the present invention even though the example shown and the language employed may appear to be more specific to a particular implementation.

Wherefore, having thus described the present invention, what is claimed is:

1. A system for finding the lowest cost path of several variable paths comprising a plurality of linked cost-incurring areas existing between an origin point and a destination point comprising:
   a) a plurality of nodes connected together in the manner of the cost-incurring areas, each said node being programmable to have a cost associated therewith corresponding to one of the cost-incurring areas, each said node having a plurality of inputs for receiving a first signal from ones of said nodes connected thereto and a plurality of outputs for outputting a second signal comprising a said first signal as received at said input reduced in magnitude as a function of the respective said cost associated with the node to others of said nodes connected thereto;
   b) signal providing means for injecting a signal into one of said nodes representing the origin point whereby said signal propagates through said plurality of nodes from said inputs to said outputs thereof being reduced in magnitude by each said node as a function of the respective said cost of the node; and,
   c) path tracing means for starting at another of said nodes representing the destination point and for following a path having the least reduction in magnitude of said signal from node to node back to said one of said nodes representing the origin point whereby the lowest cost path from the origin point to the destination point is found.

2. The system for finding the lowest cost path of claim 1 and additionally comprising:
   means for calculating the cost associated with said lowest cost as a function of the total reduction in magnitude of said signal between its injection at said one of said nodes representing the origin point and its arrival at said another of said nodes representing the destination point.

3. The system for finding the lowest cost path of claim 1 and additionally comprising:
   a) direction finding means connected to said inputs of each said node for receiving said second signal from ones of said nodes connected thereto and for providing an output indicating which of said ones of said nodes connected thereto is providing the said second signal the least reduced in magnitude; and wherein,
   b) said path tracing means includes means for using said output of said direction finding means to trace the lowest cost path from node to node.

4. The system for finding the lowest cost path of claim 3 wherein:
   a) said path tracing means and said signal providing means include a microprocessor; and each said node includes,
   b) a source of said signal to be injected;
   c) switch means for selectively connecting said outputs of said node to said source of said signal to be injected; and,
   d) microprocessor interface means connected for switching said switch means of a node to connect said outputs of said node to said source of said signal to be injected in response to a signal from said microprocessor to do so and for providing said output of said direction finding means to said microprocessor.

5. The system for finding the lowest cost path of claim 4 and additionally comprising at each said node:
   a) programmable cost memory means for changeably holding said cost associated with the node;
   b) said direction finding means further including means for including in said output thereof a maximum signal which is the said second signal as received at said inputs thereof which is the least reduced in magnitude;
   c) scale by cost means for receiving said maximum signal, for reducing it by a function of said cost in said cost memory means, and for providing an adjusted maximum signal at an output thereof; and wherein,
   d) said switch means includes means for selectively connecting said outputs of said node to said output of said scale by cost means; and,
   e) said microprocessor interface means includes means for switching said switch means of a node to connect said outputs of said node to said output of said scale by cost means when not connected to said source of said signal to be injected.

6. The system for finding the lowest cost path of claim 5 and additionally comprising at each said node:
   addressing means for allowing said microprocessor to individually address each said node on a row and column basis.

7. In a system for finding the lowest cost path of several variable paths comprising a plurality of linked cost-incurring nodes existing between an origin point and a destination point, the improvement comprising:
   a) each node including programmable cost memory means for holding a cost associated with traversing the node, each node further having a plurality of inputs for receiving a first signal from ones of the nodes connected thereto and a plurality of outputs for outputting a second signal comprising a said first signal as received at said input reduced in magnitude as a function of the respective said cost from said cost memory means to other nodes connected thereto;
   b) signal providing means for injecting a signal into one of the nodes representing the origin point whereby said signal propagates through the plurality of nodes from said inputs to said outputs thereof being reduced in magnitude by each node as a function of the respective said cost of the node; and,
   c) path tracing means for starting at another node representing the destination point and for following a path having the least reduction in magnitude of said signal from node to node back to the node representing the origin point whereby the lowest cost path from the origin point to the destination point is found.

8. The improvement to a system for finding the lowest cost path of claim 7 and additionally comprising:
   means for calculating the cost associated with said lowest cost as a function of the total reduction in magnitude of said signal between its injection at one node representing the origin point and its arrival at another node representing the destination point.

9. The improvement to a system for finding the lowest cost path of claim 7 and additionally comprising:
   a) direction finding means connected to said inputs of each node for receiving said second signal from nodes connected thereto and for providing an output indicating which of the nodes connected thereto is providing the said second signal the least reduced in magnitude; and wherein,
   b) said path tracing means includes means for using said output of said direction finding means to trace the lowest cost path from node to node.

10. The improvement to a system for finding the lowest cost path of claim 9 wherein:
   a) said path tracing means and said signal providing means include a microprocessor; and each node includes,
   b) a source of said signal to be injected;
   c) switch means for selectively connecting said outputs of the node to said source of said signal to be injected; and,
   d) microprocessor interface means connected for switching said switch means of a node to connect said outputs of the node to said source of said signal to be injected in response to a signal from said microprocessor to do so and for providing said output of said direction finding means to said microprocessor.

11. The improvement to a system for finding the lowest cost path of claim 10 and additionally comprising at each node:
   a) said direction finding means further including means for including in said output thereof a maximum signal which is the said second signal as received at said inputs thereof which is the least reduced in magnitude;
   b) scale by cost means for receiving said maximum signal, for reducing it by a function of said cost in said cost memory means, and for providing an adjusted maximum signal at an output thereof; and wherein,
   c) said switch means includes means for selectively connecting said outputs of the node to said output of said scale by cost means; and,
   d) said microprocessor interface means includes means for switching said switch means of a node to connect said outputs of the node to said output of said scale by cost means when not connected to said source of said signal to be injected.

12. The improvement to a system for finding the lowest cost path of claim 11 and additionally comprising at each node:
   addressing means for allowing said microprocessor to individually address each node on a row and column basis.

13. In a system for finding the lowest cost path of several variable paths comprising a plurality of linked cost-incurring nodes existing between an origin point and a destination point by injecting a signal into one of the nodes and tracing it back along a least cost path from another of the nodes using a microprocessor and including path tracing means for starting at a node representing the destination point and for following a path having the least reduction in magnitude of said signal from node to node back to the node representing the origin point and means for calculating the cost associated with said lowest cost as a function of the total reduction in magnitude of said signal between its injection at one node and its arrival at another node representing the destination point, the nodes each comprising:
   a) programmable cost memory means for holding a cost associated with traversing the node;
   b) a plurality of inputs for receiving a first signal from others of the nodes connected thereto and a plurality of outputs for outputting a second signal comprising a said first signal as received at said input reduced in magnitude as a function of the respective said cost from said cost memory means to still others of the nodes connected thereto;
   b) signal providing means for injecting a signal into one of the nodes representing the origin point whereby said signal propagates through the plurality of nodes from said inputs to said outputs thereof being reduced in magnitude by each node as a function of the respective said cost of the node;
   c) direction finding means connected to said inputs of each node for receiving said second signal from nodes connected thereto and for providing an output indicating which of the nodes connected thereto is providing the said second signal the least reduced in magnitude; and,
   d) the path tracing means includes means for using said output of said direction finding means to trace the lowest cost path from node to node.

14. The nodes for use in a system for finding the lowest cost path of claim 13 wherein the path tracing means and the signal providing means include a microprocessor and each node additionally includes:
   a) a source of said signal to be injected;

b) switch means for selectively connecting said outputs of the node to said source of said signal to be injected; and, c) microprocessor interface means connected for switching said switch means of a node to connect said outputs of the node to said source of said signal to be injected in response to a signal from said microprocessor to do so and for providing said output of said direction finding means to said microprocessor.

15. The nodes for use in a system for finding the lowest cost path of claim 14 and additionally comprising at each node:

a) said direction finding means further including means for including in said output thereof a maximum signal which is the said second signal as received at said inputs thereof which is the least reduced in magnitude;

b) scale by cost means for receiving said maximum signal, for reducing it by a function of said cost in said cost memory means, and for providing an adjusted maximum signal at an output thereof; and wherein, c) said switch means includes means for selectively connecting said outputs of the node to said output of said scale by cost means; and, d) said microprocessor interface means includes means for switching said switch means of a node to connect said outputs of the node to said output of said scale by cost means when not connected to said source of said signal to be injected.

16. The nodes for use in a system for finding the lowest cost path of claim 15 and additionally comprising at each node:

addressing means for allowing the microprocessor to individually address each node on a row and column basis.

17. A method for finding the lowest cost path of several variable paths comprising a plurality of linked cost-incurring areas existing between an origin point and a destination point on close to a real time basis comprising the steps of:

a) connecting a plurality of nodes together in the manner of the cost-incurring areas;

b) programming each node to have a cost associated therewith corresponding to one of the cost-incurring areas;

c) injecting a signal into one of the nodes representing the origin point;

d) propagating the signal through the plurality of nodes from inputs to outputs thereof;

e) reducing the signal in magnitude at each node as a function of the respective cost of the node; and, f) starting at one of the nodes representing the destination point and following a path having the least reduction in magnitude of the signal from node to node back to the one of the nodes representing the origin point whereby the lowest cost path from the origin point to the destination point is found.

18. The method for finding the lowest cost path of claim 17 and additionally comprising the step of:

calculating the actual cost associated with the lowest cost path as a function of the total reduction in magnitude of the signal between its injection at the node representing the origin point and its arrival at the node representing the destination point.

19. The method for finding the lowest cost path of claim 17 and at each node additionally comprising the steps of:

a) receiving the signal from ones of the nodes connected thereto;

b) providing an output indicating which of the ones of the nodes connected thereto is providing the signal the least reduced in magnitude; and wherein, c) said step of following a path having the least reduction in magnitude of the signal from node to node includes the step of using the output indicating which of the ones of the nodes connected thereto is providing the signal the least reduced in magnitude to trace the lowest cost path from node to node.

20. The method for finding the lowest cost path of claim 19 wherein each node includes a source of the signal to be injected and switch means for selectively connecting outputs of the node to the source of the signal to be injected and at each node additionally including the steps of:

a) switching the switch means of the node to connect the outputs of the node to the source of the signal to be injected in response to a signal from a microprocessor to do so; and, b) providing the output indicating which of the ones of the nodes connected thereto is providing the signal the least reduced in magnitude to the microprocessor.

21. The method for finding the lowest cost path of claim 20 and additionally at each the node comprising the steps of:

a) providing programmable cost memory means for changeably holding the cost associated with the node;

b) finding a maximum signal which is the signal as received at inputs thereof which is the least reduced in magnitude;

c) reducing the maximum signal by a function of the cost in the cost memory means;

d) providing an adjusted maximum signal as an output thereof; and, e) switching the switch means of a node to connect the outputs of the node to the output providing the adjusted maximum signal when not connected to the source of the signal to be injected.

* * * * *